US012785462B2

(12) United States Patent
Bickel

(10) Patent No.: US 12,785,462 B2
(45) Date of Patent: Nov. 3, 2026

(54) STATOR

(71) Applicant: BorgWarner Inc., Auburn Hills, MI (US)

(72) Inventor: Jonas Bickel, Mainz (DE)

(73) Assignee: BORGWARNER INC., Auburn Hills, MI (US)

( * ) Notice: Subject to any disclaimer, the term of this patent is extended or adjusted under 35 U.S.C. 154(b) by 220 days.

(21) Appl. No.: 18/777,831

(22) Filed: Jul. 19, 2024

(65) Prior Publication Data

US 2025/0030279 A1 Jan. 23, 2025

(30) Foreign Application Priority Data

Jul. 21, 2023 (DE) ........................ 102023119350.3

(51) Int. Cl.

*H02K 1/14* (2006.01)
*H02K 3/24* (2006.01)
*H02K 3/32* (2006.01)
*H02K 3/34* (2006.01)
*H02K 3/52* (2006.01)

(52) U.S. Cl.

CPC ............... *H02K 1/146* (2013.01); *H02K 3/24* (2013.01); *H02K 3/325* (2013.01); *H02K 3/345* (2013.01); *H02K 3/522* (2013.01)

(58) Field of Classification Search

CPC ...... H02K 2203/12; H02K 3/325; H02K 3/24; H02K 3/345; H02K 3/522; H02K 1/146

See application file for complete search history.

(56) References Cited

U.S. PATENT DOCUMENTS

| | | | | |
|---|---|---|---|---|
| D539,219 | S | 3/2007 | Wang et al. | |
| 8,278,803 | B2 | 10/2012 | Lin et al. | |
| 8,736,129 | B2 | 5/2014 | Wang et al. | |
| 2016/0111933 | A1 | 4/2016 | Takimoto | |
| 2017/0222513 | A1 * | 8/2017 | Lee | H02K 3/345 |
| 2019/0222081 | A1 | 7/2019 | Kato et al. | |
| 2022/0352778 | A1 * | 11/2022 | Veronesi | H02K 3/325 |

OTHER PUBLICATIONS

U.S. Appl. No. 18/373,577, filed Sep. 27, 2023.

* cited by examiner

*Primary Examiner* — Leda T Pham

(74) *Attorney, Agent, or Firm* — Howard & Howard Attorneys PLLC

(57) ABSTRACT

A stator comprises a core having teeth, at least a first end cap and second end cap which each have a base and a winding wire support. The end caps are arranged on the same tooth so that the bases are directed toward the front sides of the tooth. The stator also has a winding having at least one winding wire which is wound over the end caps around the tooth. The support has two projections which project at opposite sides over the base. The wire extends over the projections of the first and second end caps. An insulation film comprises front edges and extends between one of the projections of the first end cap and the opposite projection of the second end cap and is arranged between the wire and the tooth. The wire extends over the projections without applying any force action to the front edges of the film.

18 Claims, 8 Drawing Sheets

STATOR

CROSS-REFERENCE TO RELATED APPLICATIONS

This application claims priority pursuant to 35 U.S.C. 119 (a) to German Patent Application No. 102023119350.3, filed Jul. 21, 2023, which application is incorporated herein by reference in its entirety.

BACKGROUND

The invention relates to a stator, in particular a stator for an electric machine.

An electric motor can be used in vehicles, for example, utility vehicles. The vehicle may have a drive which is an alternative to the combustion engine for fossil fuels in order to reduce carbon dioxide emissions. Such an electric drive can be supplied, for example, by a fuel cell or a battery. An area of use of an electric motor in vehicles is cooling the drive, battery or electronic unit. The electric motor drives a fan which cools the components. For this use, compact dimensions, including in an axial direction, and a high power are desirable.

A stator is a part of an electric machine, for example, of an electric motor. The stator is a fixed part of the electric motor, in which the rotor rotates as a rotating member of the electric motor. The stator has a stator winding, by which a time-variable magnetic field, which brings about the rotation of the rotor, is induced by means of a time-variable current flow.

The stator comprises a stator core having a plurality of stator teeth, on the opposite front sides of which end caps are arranged. A stator winding comprises winding wires which extend in a coil-like manner around the stator teeth and the end caps thereof. The end caps retain and guide the stator winding. A conventional stator is hand-wound. Both the winding and the wire guiding thereof between the coils are produced in a manual method. The insulation between the stator components is carried out with Kapton tape, an insulation paper or flame-inhibiting composite materials which are classified, for example, as FR4. The components are cast. As a result of undesirable air bubbles in the casting which negatively influence the thermal behavior, overheating may occur.

U.S. Pat. No. 8,736,129 B2 sets out an end cap of a stator segment which is provided for use in positioning wires in a segmented stator subassembly in desired positions. The end cap comprises a body and an internal wall. Clamping pockets for receiving the wires and for producing the desired electrical connections are provided in the body. Steps which are located in the clamping pockets assist in securing the connectors in the clamping pockets. At the outer side of the clamping pockets, there are located plateaus and cavities which are defined in the plateaus in order to trim the wires which are received in the clamping pockets as desired. Retaining structures which assist in bringing the wires into the desired positions are located around the end cap.

An end cap for a segmented stator is also set out in US D539219 S.

U.S. Pat. No. 8,278,803 B2 sets out an electric motor which is provided with a set of end cap guides at the ends of a stator winding subassembly in order to control the placement of the end caps in the correct position relative to the stator winding subassembly so that the rotor subassembly is retained concentrically relative to the stator. The end cap guides may be rings which fit into the winding insulators at the ends of the stator assembly or they can be integrated in the winding insulators as guide segments in order to form an interrupted cylindrical internal face which corresponds to the internal diameter of the stator winding subassembly. The guides allow the correct positioning of the rotor subassembly without increasing the length of the stator assembly.

An object is to provide an alternative stator in which the risk of overheating is reduced.

SUMMARY

The object is achieved by a stator having the features of claim 1. The stator is provided with a stator core which comprises a plurality of stator teeth each having a first and a second front side and with at least a first end cap and at least a second end cap which each comprise a base and a winding wire support, wherein the first end cap is arranged on the first front side of one of the stator teeth and the second end cap is arranged on the second front side of the same stator tooth so that the bases of the end caps are directed toward the front sides. A stator winding has at least one winding wire which is wound over the first end cap and the second end cap around the stator tooth. The winding wire support has two projections which project at opposite sides over the base, wherein the winding wire extends over the projections of the first and second end caps. There is provided an insulation film which comprises front edges and which extends between one of the projections of the first end cap and the opposite projection of the second end cap and which is arranged between the winding wire and the stator tooth, wherein the winding wire extends over the projections of the winding wire support without applying any force action to the front edges of the insulation film.

The stator is provided for an electric machine, in particular for an electric motor. The stator is the fixed portion of the electric machine, in particular. There is inside the stator an empty space, in which in the electric machine the rotatable rotor thereof is arranged. The above-described arrangement is advantageously cast so that the stator winding is embedded in the hardened casting material.

The stator core has the empty space for the rotor and a plurality of stator teeth which extend radially and on which the stator winding is arranged. An axial direction corresponds to a longitudinal axis which extends through the empty space and which is also the rotation axis of the rotor. The front sides are in planes perpendicular to the axial direction. The empty space is surrounded by an annular region of the stator core. The stator teeth advantageously extend outward. In one embodiment, the stator teeth each have a widened end region so that the stator winding is supported in a radially outward direction. The radial support in an inward direction is brought about by the annular region. The stator core advantageously comprises iron and is in the form of a metal sheet assembly comprising stacked metal sheets.

The stator winding comprises at least one winding wire in order to form one or more poles on the stator teeth. The winding wire advantageously comprises copper and/or aluminum. In one embodiment, the stator winding is in the form of an individual winding so that a coil having a plurality of windings is wound around precisely one stator tooth. Such an individual winding is also referred to as a concentrated winding. Nevertheless, one pole may comprise a plurality of coils on adjacent stator teeth. The opposite of individual winding is distributed winding, in which a coil extends over a plurality of stator teeth.

The end caps are arranged on the front sides of the stator teeth. The winding wire forms a coil around one of the stator teeth by the winding wire being wound multiple times over the end caps and the stator tooth. The coil extends in an axial direction along longitudinal sides of the stator core. The axially extending longitudinal sides of two adjacent stator teeth are facing each other. The longitudinal sides of a stator tooth are opposite each other. A plan view contour of the longitudinal side can be tub-like. The coil has a plurality of layers of winding wire, wherein a first layer touches the end cap. Peripheral winding wire portions also touch the end cap.

The end caps are advantageously made from an insulating material, for example, a plastics material. In one embodiment, the end caps are in the form of injection-molded components. One alternative involves 3D end caps. A bottom view contour of the end caps advantageously corresponds at least virtually to a plan view contour of the stator teeth so that the end caps are positioned in the region of the longitudinal sides flush or virtually flush on the stator teeth. The connection of the end caps and stator teeth can, for example, be an adhesive connection. Adhesive bonding, but also clip-fitting, of the end caps allows a rapid production.

The winding wire support of the end cap is a region which retains and supports the winding wire of the coil on the end cap, wherein the support is brought about axially and radially. The winding wire support advantageously has a tub-like or rectangular contour, the base of which is a support and axial support for the first layer of the coil and the sides of which radially support the coils. The winding wire support advantageously has an external and an internal winding space delimitation which are radially spaced apart. The mutually facing sides of the external and internal winding space delimitation can be chamfered so that the coil becomes wider with increasing distance from the stator tooth. In one embodiment, the external winding space delimitation has walls which project axially above the base and between which there is a gap. The internal winding space delimitation comprises two hollow support posts which have a hollow-cylindrical basic shape.

The recesses in the support posts can be used in order to secure thereon an additional component which is arranged at the front and which engages with knobs in the recesses in order thus to form a connection with the support posts. Consequently, the end caps afford ways of assembling and positioning a module which can be positioned at the front on the end caps of the stator. Such a module can be provided to wire and/or to interconnect and/or to supply power to the stator winding. Via this module, for example, the guiding of the wires between mutually spaced-apart poles and/or the interconnection between the poles and/or the supply of the arrangement, for example, by leadframes in the module can be brought about.

The base of the end cap spaces the winding wire support apart from the front side of the stator core. The winding wire extends in an axial direction along opposite longitudinal sides of the base. Projections at opposite sides of the winding wire support project beyond the base so that the base is delimited at the side, which faces away from the front side of the stator core, by means of a projecting, lower edge of the projection. The projection advantageously extends transversely relative to the axial direction. In one winding region, the winding wire is guided along the base and the projection advantageously extends in the entire winding region over the base along the front edge of the insulation film. The winding wire extends in an axial direction between the opposite projections of the first and second end cap and is thereby spaced apart from the base and the longitudinal side of the stator tooth.

In one embodiment, the end caps are each constructed in a mirror-symmetrical manner relative to the radial direction. The first and second end caps on the opposite front sides of the stator core are advantageously constructed identically and arranged in a mirror-symmetrical manner relative to each other. In one embodiment, the end caps on the first or second front side are in the form of an integral end disk. Such an end disk comprises all the end caps of a front side and is advantageously in the form of an integral plastics component. Alternatively, a plurality of, but not all of the end caps at the same front side are in the form of an integral end disk segment so that the end disk comprises a plurality of end disk segments which extend in an arc-like manner, for example, three thereof.

The insulation film is a film made of non-conductive material. To this end, the term "insulation paper" is also conventional, but with paper not necessarily being involved. The insulation film is arranged between the winding wire and one of the axially extending longitudinal sides of the stator tooth and the front bases in order to insulate the metal components and to protect them from partial discharges. The insulation film brings about an axial insulation of the stator core. At the opposite longitudinal side of the stator tooth, insulation film is also arranged in the same manner.

The projections prevent an application of force to the front edges of the insulation film. This is intended to be understood to mean an application of force in an axial direction to the mutually axially opposite edge sides of the insulation film which face the projections. The axial direction extends between the front sides. The insulation film extends between the front sides. The insulation film extends between the opposite, balcony-like projections of the first and second end cap so that the winding wire which extends over the projections does not bring about a force, which extends in an axial direction, to the front edges of the insulation film which face the projections. Neither when the winding is applied, nor as a result of the applied stator winding itself, do the front edges become subjected to an axial force application which could deform the insulation film. Therefore, the insulation film is located precisely between the end caps and the longitudinal side of the stator and the winding wire.

A deformation of the insulation film is undesirable because it can negatively influence the thermal behavior of the stator. As a result of the deformation, in particular a compression of the insulation film or bulging in the insulation film, air can become enclosed and can no longer escape during casting so that air bubbles between the insulation film and the stator core are produced. Since the stator core is also used to discharge heat away from the stator winding, a good thermal coupling between the stator winding and the stator core is important in order to prevent overheating. If, however, air bubbles are present, they inhibit the thermal coupling between the stator winding and the stator core as a result of the thermal insulation action thereof and inhibit the discharge of heat.

In order to avoid axial loads or a deformation as a result of the projections themselves, the length of the insulation film is advantageously slightly less than the spacing of the projections. The insulation film is supported loosely on the stator core so that it is movable in an axial direction before the stator winding is applied. The projections, between which the insulation film extends, each have a stop which is in the form of a forwardly projecting edge of the projection in order to stop the axial movement of the insulation film. This stop is constructed in such a manner that axial forces are avoided on the front edges of the insulation film. Such forces could deform the insulation film and have the consequences described above. Advantageously, the stop has a width which corresponds to the thickness of the insulation film so that an axial force application to the front edges of the insulation film is safely avoided and the winding wire and the stator core are arranged as near each other as possible in the region of the longitudinal sides of the stator core as a result of the good thermal coupling; only the insulation film is therebetween. By the stator winding being positioned as near the stator core as possible, an excellent heat transfer to the stator core, which is particularly cooled by water, is enabled and therefore the thermal behavior and consequently the total power capacity of the stator is improved in comparison with a conventional stator.

During the insulation adaptation, the insulation film allows the necessary leakage current resistance from the coil to the stator core to be adapted so that a predetermined leakage current strength is not exceeded. The insulation film extends beyond the stator core so that the insulation film and the bases of the first and second end caps overlap. In this overlap region, the insulation film extends between the winding wire and the bases. An overlap length of the portion of the insulation film which overlaps with the base contributes to the leakage path between the coil, which is made of metal, in particular copper, and the stator core which is made of metal, in particular iron. The overlap length corresponds to the necessary leakage path with the addition of a safety buffer between the winding wire and the stator core. As a result of this configuration, an end cap collar over the stator core, as in a conventional stator, is unnecessary and the end caps and the stator core do not overlap. The stator with the above-described insulation film has not only good thermal properties but also a good insulation, which improve the efficiency.

Taking into consideration such factors as the necessary internal diameter of the stator core, a maximum predetermined length and a desired stator arrangement which is as compact as possible, the stator is sized to be as large as necessary and as small as possible. The small axial length which allows the stator configuration described is associated with a compact stator unit.

In one embodiment, the insulation film is a first insulation film which extends along a first longitudinal side of the stator tooth. A second insulation film extends along a second longitudinal side, which is opposite the first longitudinal side, of the stator tooth between the other projection of the first end cap and the opposite projection of the second end cap and is arranged between the winding wire and the stator tooth and between the winding wire and the bases. The insulation films at the longitudinal sides of the stator tooth each also extend along the adjacent longitudinal side of the adjacent stator tooth. Such an insulation film which extends between two adjacent stator teeth can be pre-bent so as to follow the plan view contour of the stator teeth so that they can readily be clip-fitted between the stator teeth into the position thereof and be retained by the stator teeth in a non-positive-locking manner.

All the stator teeth of the stator core with the end caps thereof and the insulation films at both longitudinal sides are configured in the same manner as described above.

The stator can be produced mechanically. The stator winding is advantageously applied in a state wound with needles. During winding with needles, a nozzle-like needle which guides the winding wire to the stator core is moved horizontally and vertically along the stator core. In this case, it runs around the stator core and wraps around it at the longitudinal sides. In the case of outwardly projecting stator teeth, the needle can readily apply the winding of the coils by the winding being guided between the gaps between adjacent stator teeth. This production of the mechanically wound stator is associated with a time and cost saving.

The wire guiding between the coils of adjacent stator teeth is supported during the winding process by the two support posts of the internal winding wire delimitation by the winding wire between two adjacent coils being guided by the two support posts and internally along the support posts. Consequently, the support posts are used both to radially support the coil and to guide winding wires at the transition to the adjacent stator tooth.

The winding wire support is advantageously constructed in such a manner that it acts as a support structure for forming an orthocyclic winding. The wires form a tight assembly in which the wires of upper layers are arranged in the grooves of lower layers. In order to support this winding, the winding wire support has 60° inclinations and corresponding guiding grooves. The 60° grooves are integrated in the winding space delimitations, the mutually facing sides of which have such an inclination. This configuration ensures static stability during the needle winding process by the inclinations receiving the loads which occur and redirecting the forces into the base and the bottom region of the winding wire support. The winding space delimitations with the support posts are integrated in the cap construction in order to provide a structural rigidity for the forces which occur in the machine winding. Additionally, the support post further provides a docking method for an additional component, as already described above.

Guiding grooves, particularly in the rounded projection, in a radial and axial direction support the correct, predetermined positioning of the first winding layer which is positioned directly on a base between the winding space delimitations of the winding wire support. The first wire layer thereby also provides a reliable support with predetermined positions for all the wire layers which are located above. The contour of the guiding grooves is advantageously in the form of a polynomial line in a state composed of splines. In comparison with a circular-arc shape, the axial spatial requirement of the winding wire is reduced and nevertheless a bulging deformation of the winding wire, the so-called “belly effect”, is minimized during winding of the pre-bent wire, starting in a radial direction. In addition to the term “belly effect”, the term “barrel effect” is also used.

In a subsequent production step, the stator is cast. Flow channels in the end caps provide under the coil space for the casting material which is still fluid. This results in better flowing behavior of the casting material and fewer air bubbles in the hardened casting, which results in better thermal behavior.

Ventilation holes are advantageously provided in the end caps. The ventilation holes extend from an empty space on the end cap lower side in particular axially through the winding wire support and/or radially through a front face of the end cap. In one embodiment, the ventilation hole is arranged in the flow channel. Air accumulations under the end cap are prevented, and the flow of the casting compound during casting is made easier, by the ventilation hole.

As a whole, the stator combines good insulation adaptation, ability to be mechanically wound and small axial length in a castable arrangement. The stable arrangement of the insulation film in the stator, in which axial loading is kept away from the front edges of the insulation film, prevents the deformation of the insulation film and the formation of air bubbles during casting.

BRIEF DESCRIPTION OF THE DRAWINGS

A number of exemplary embodiments are explained in greater detail below with reference to the drawings, in which.

In the Figures, identical or functionally equivalent components are indicated with the same reference numerals.

DETAILED DESCRIPTION

Figure 1:
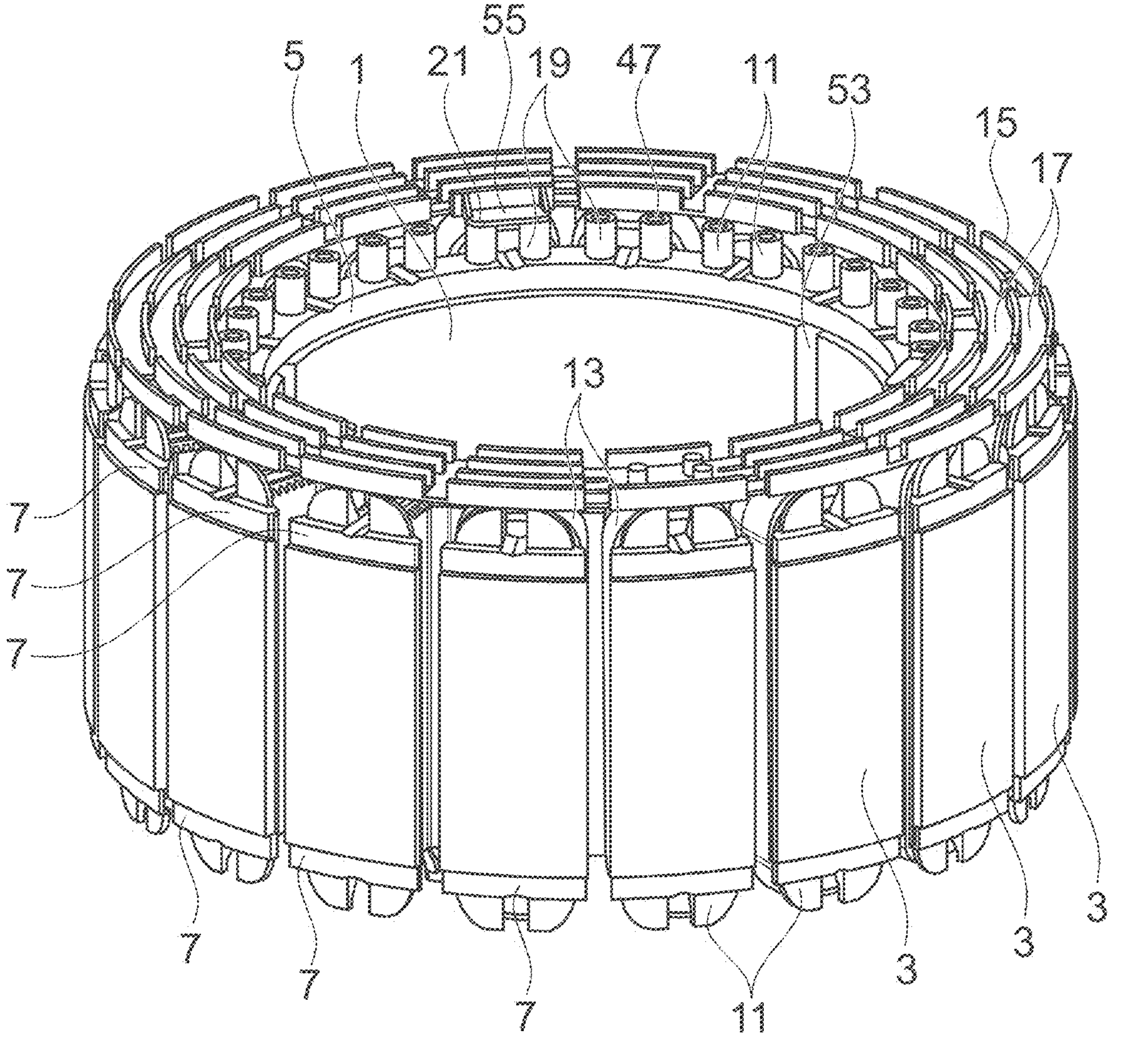
FIG. 1 shows a three-dimensional view of an exemplary embodiment of a stator.

FIG. 1 shows a three-dimensional view of an exemplary embodiment of a stator. It comprises a stator core 1 having a metal sheet assembly. In the stator core 1, outwardly projecting stator teeth 3 are constructed in a circumferential manner. End disks 5, the bottom view contour of which at least substantially corresponds to the plan view contour of the stator core 1, are arranged on the two opposite front sides of the stator core 1. The end disks 5 are adhesively bonded. The end disks 5 comprise end caps 7 on the front sides of the stator teeth 3. The end disk 5 can be constructed in one piece, as in this exemplary embodiment, or in multiple pieces. The end caps 7 have winding wire supports 9 with internal and external winding space delimitations 11 for a stator winding 13. Each of the two end disks 5 is orientated in a predetermined manner on the stator core 1 by positioning pins of the end disks 5 which engage in grooves 53 in the stator core 1. Positioning pins and grooves 53 are associated with simple production.

The stator winding 13 which extends over the stator tooth 3 and the end caps 7 thereof extends in the winding wire support 9 with a plurality of winding wires 39 which are retained by the winding wire support 9 and radially supported by the winding space delimitations 11 thereof. The stator winding 13 comprises individual windings, in which each winding wire 39 is wound in a coil-like manner around adjacent stator teeth 3 in order to form a pole. The stator in this exemplary embodiment has six poles which each comprise three stator teeth 3. Merely for illustration, no winding wire 39 is illustrated on three of the stator teeth 3 which are arranged at the front left. The electrical power supply of the stator winding 13 is brought about by three-phase current. For the sake of clarity, a supply connection is not illustrated.

When such a stator is produced, the formation of the stator winding 13 is carried out by needle winding. During needle winding, a needle which guides the winding wire 39 to the stator core 1 is moved around each of the stator teeth 3 of a pole. In this case, the needle runs around the stator core 3 and winds it.

At one of the end disks 5, a wire guiding module 15 with channels 17 for the winding wires 39 which extend between the poles is placed and forms a positive-locking or non-positive-locking connection 21 with the end disk 5. For example, the wire guiding module 15 is clip-fitted, clamped or bonded. In this exemplary embodiment, the internal winding space delimitations 11 are in the form of pairs of hollow support posts 19. Two knobs of a corresponding connection means 55 of the wire guiding module 5 engage in the recess 47 of two adjacent support posts 19 which act as connection means in order to form a connection.

The winding wires 39 are guided via the wire guiding module 15 between adjacent poles for the same phase. Furthermore, the interconnection is carried out on the wire guiding module 15, for example, in a star-like circuit. For the sake of clarity, however, the winding wires are not illustrated on the wire guiding module 15.

The above-described stator is further cast in order to achieve a durable connection between the wire guiding module 15 and the end disk 5 and to protect the components, in particular the stator winding 13.

Figure 2:
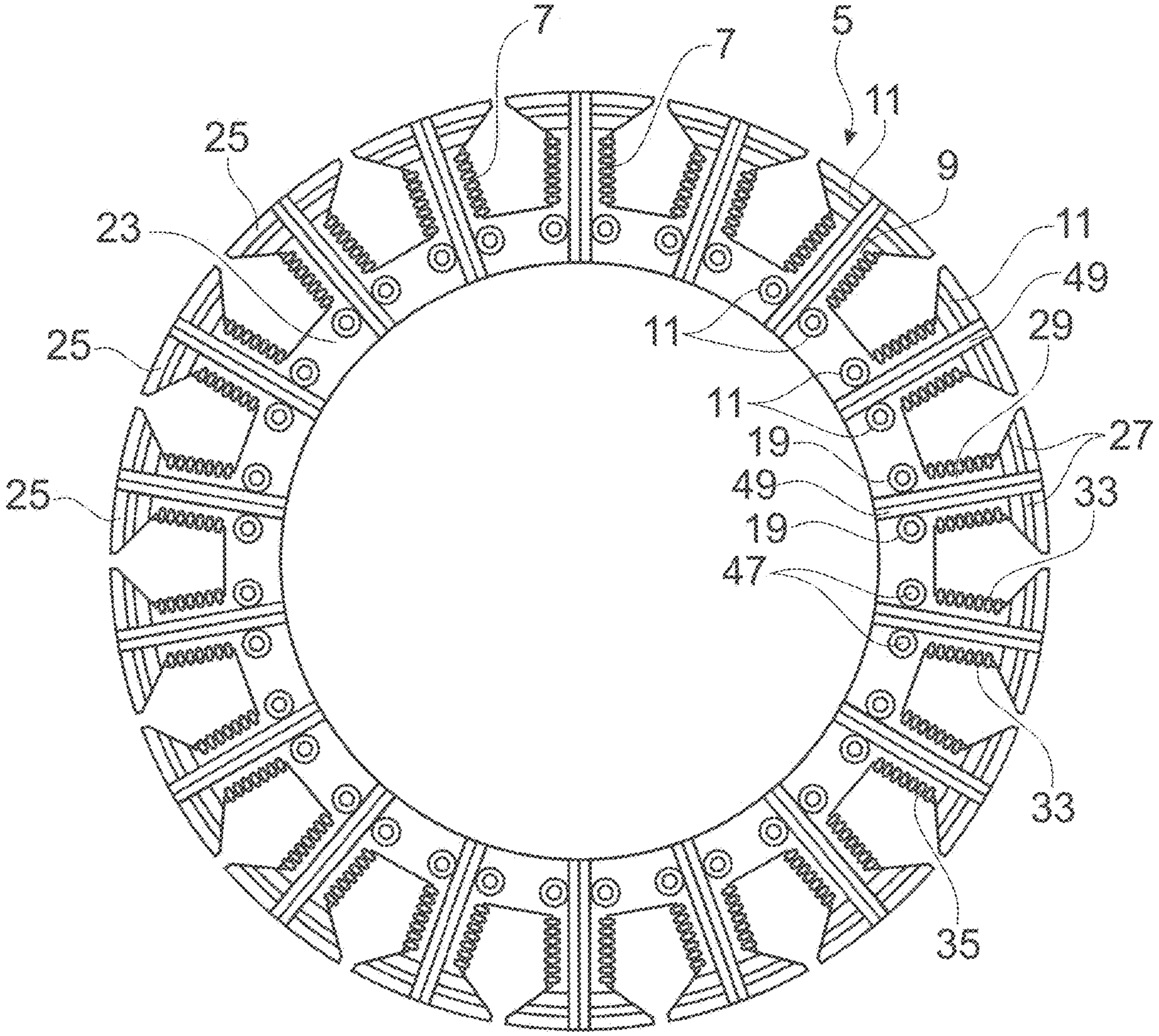
FIG. 2 shows a plan view of an exemplary embodiment of an end disk.

FIG. 2 shows a plan view of an exemplary embodiment of an end disk 5, as positioned on both front sides of the stator core 1. The end disk 5 has an annular internal region 23, from which T-shaped regions 25 extend radially outward. The T-shaped regions 25 have expanded end regions.

The end disk 5 is constructed integrally and comprises a plurality of end caps 7, eighteen in this exemplary embodiment, which are positioned on the stator teeth 3. Each end cap 7 comprises a curved portion of the end disk 5 with an outwardly projecting T-shaped region 25.

A winding wire support 9 for the stator winding 13 is provided at the upper side of each end cap 7. The winding wire support 9 is radially delimited by an external and an internal winding space delimitation 11, between which the winding wire 39 of the stator winding 13 extends. The winding space delimitations 11 on the annular internal region 23 and the expanded end region support the winding wire in a radial direction. A base 29, which axially supports the coil, of the winding wire support 9 is between the winding space delimitations 11. The lateral edges of the base 29 extend substantially parallel with the radial direction. The external winding space delimitation 11 comprises walls 27 which project axially above the winding wire support and between which there is a gap. The internal winding space delimitation 11 comprises two hollow support posts 19 with a cylindrical basic shape. A flow channel 49 for casting material as a recess in the winding wire support 9 extends in a radial direction between the gap and the support posts 17.

The winding wire support 9 is constructed so as to project above a base 31 (not visible in FIG. 2) under the winding wire support 9. Opposite projections 33 above the base 31 have in the base region guiding grooves 35 in which the winding wire 39 extends substantially transversely relative to the radial direction above the base 29. The guiding grooves 35 predetermine for a first layer the positioning of the winding wire portions directly on the winding wire support 9. Additional layers are arranged above.

Figure 3:
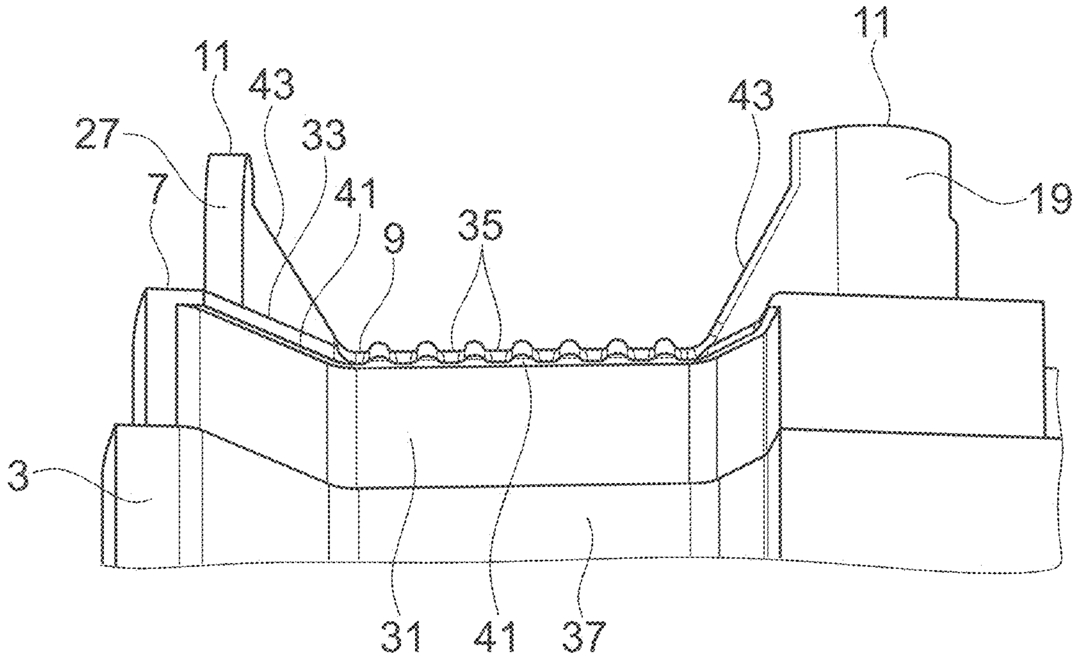
FIG. 3 shows a three-dimensional side view of an exemplary embodiment of an end cap on a stator tooth.

FIG. 3 shows a three-dimensional illustration of a side view of an exemplary embodiment of an end cap 7 on a stator tooth 3. FIG. 3 illustrates only one of the end caps 7 and a portion of the stator tooth 3.

The end cap 7 has a base 31 which faces the front side of the stator tooth 3. The base 31 extends under the winding wire support 9 and spaces it apart from the stator core 1. The base 31 extends flush or virtually flush with a longitudinal side 37 of the stator, along which the winding wire 39 (not illustrated in FIG. 3) extends. The end cap 7 does not overlap with the stator core 2. The longitudinal side 37 of the stator tooth 3 has a tub-like plan view contour which radially supports the coil comprising winding wire 39. At the upper side of the base 31, there is an edge 41 which projects both above the base 31 and above the longitudinal side 37 of the stator core 1. This edge 41 is a lower side, which faces the base 31, of the projection 33. The projection 33 has guiding grooves 35 for the winding wire 39, which is associated with a wave-like plan view contour of the bottom edge.

The walls 27 and support posts 19 acting as internal or external winding space delimitations 11 are at the mutually facing sides in the form of ramp-like inclinations 43 and form therewith an oblique support and radial support of the stator winding 13. The ramp-like sides are 60° inclinations in order to support an orthocyclic winding radially and to provide the support thereof.

The opposite end cap 7 which is not illustrated in FIG. 3 at the other front side of the stator tooth 3 is constructed identically and arranged as a mirror image. The other stator teeth 3 and the end caps 7 thereof are constructed in the same manner.

Figure 4:
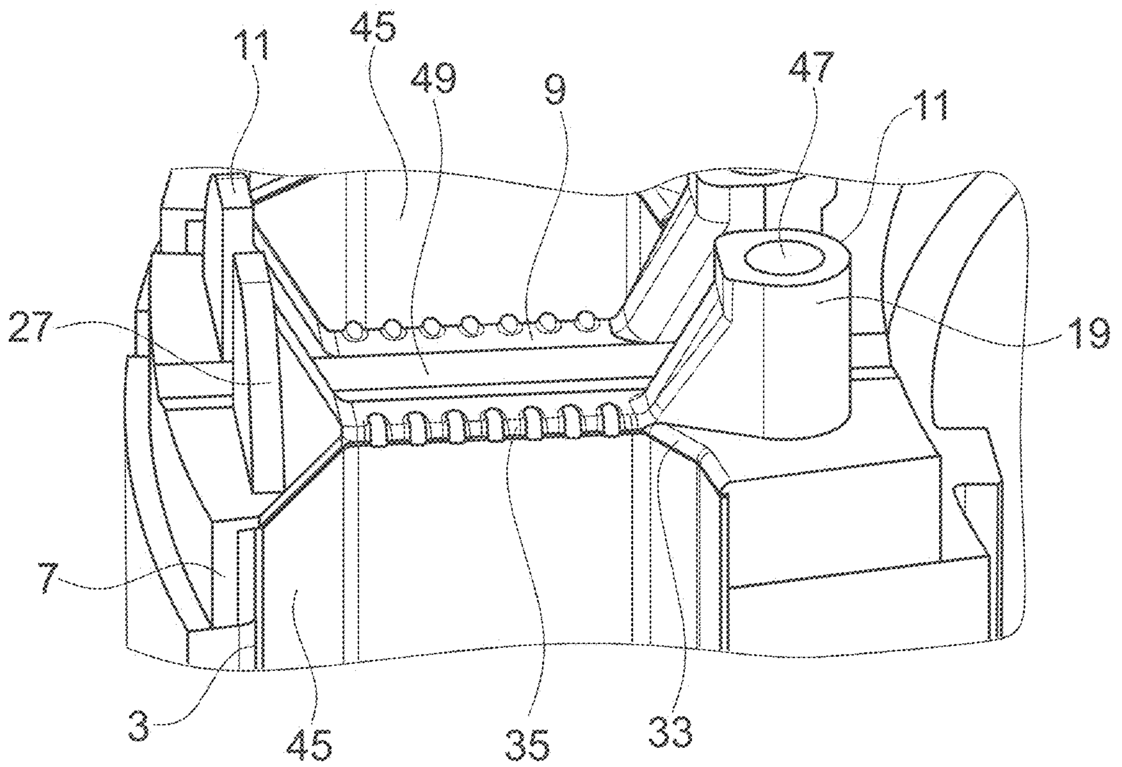
FIG. 4 shows a three-dimensional illustration of a view, obliquely from above, of the end cap on the stator tooth with an insulation film.

FIG. 4 shows a three-dimensional illustration of a view, obliquely from above, of the end cap 7 on the stator tooth 3 and insulation film 45 at the longitudinal sides 37 of the stator tooth 3. Instead of insulation film 45, the term "insulation paper" is also conventional. FIG. 4 illustrates only one of the end caps 7 and a portion of the stator tooth 3.

The insulation film 45 extends on a longitudinal side 37, which is at the front in the illustration, of the stator tooth 3 between the opposite projections 33 of the end caps 7 at the opposite front sides of the stator tooth 3. The insulation film 45 is longer than an axial height of the stator tooth 3 so that the upper and lower portions thereof overlap with the bases 31 of the end caps 7. Advantageously, the insulation film 45 extends as far as the edges 41 of the projections 3. However, the insulation film 45 is not compressed by the edges 41. Instead, the insulation film 45 has play in an axial direction which is limited by the edges 41 which act as stops. In order to prevent the compression of the insulation film 45, a buffer is provided as the difference of the spacing and length between the length thereof and the spacing of the opposite projections 33 of the opposite end caps 7. Advantageously, the thickness of the insulation film 45 is as great as or slightly less than the width of the edge 41. Nevertheless, regions, which define guiding grooves 35 and between which the winding wire 39 extends (not illustrated in FIG. 4), of the projection 33 can project over the insulation film 45.

An additional insulation film 45 is arranged in the same manner at the opposite longitudinal side 37 of the stator teeth 3. It extends as far as the adjacent longitudinal side 37 of the adjacent stator tooth 3 and extends at the adjacent longitudinal side 37 thereof between the end caps 7, as described above.

The insulation film 45 forms an insulating layer between the metal winding wire 39, which is wound on the stator tooth 3, and the metal stator tooth 3.

Figure 5:
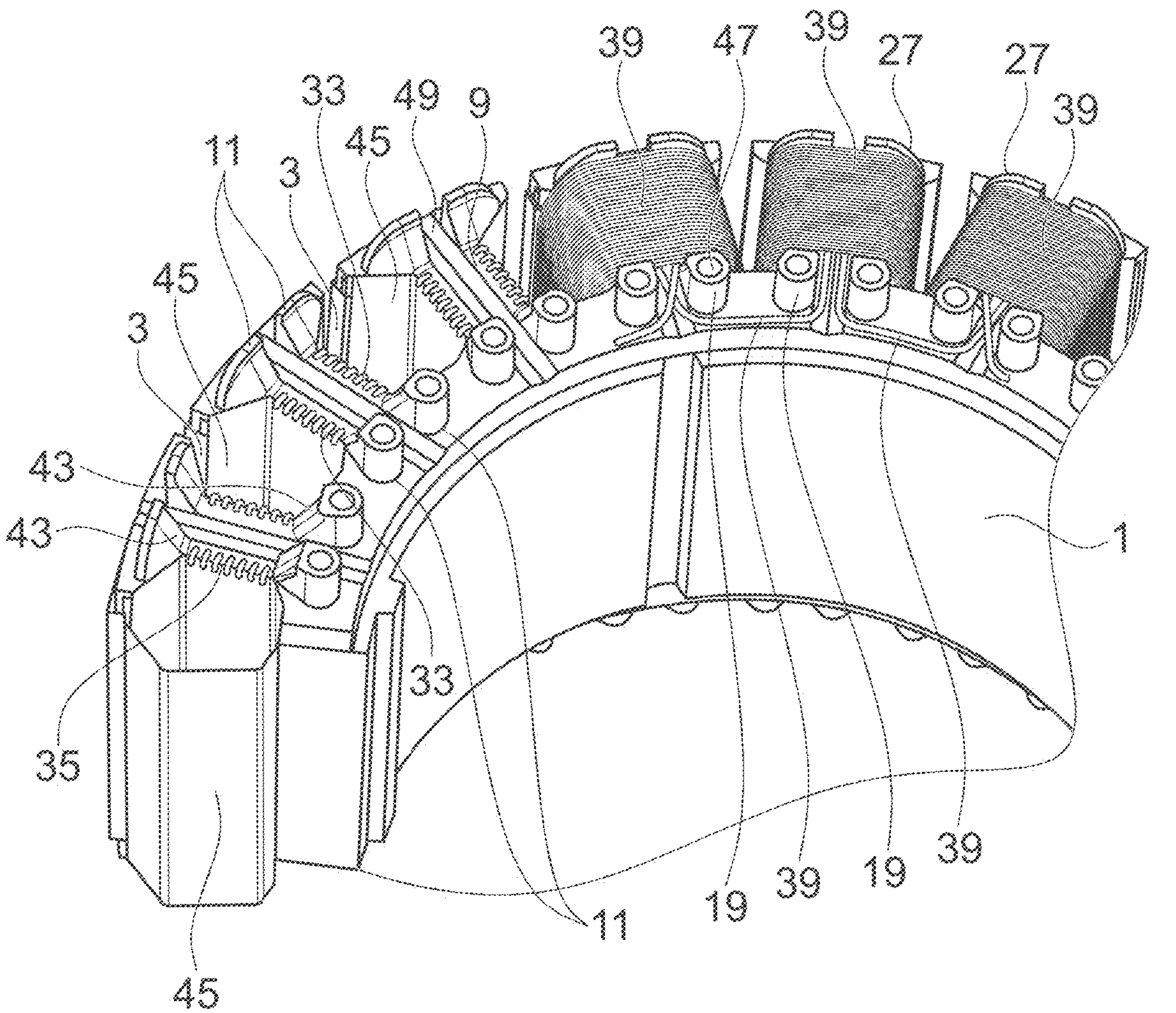
FIG. 5 shows a three-dimensional partial illustration of an exemplary embodiment of the stator with a plurality of stator teeth and end caps.

FIG. 5 shows a three-dimensional illustration of a cutout of the stator with a plurality of stator teeth 3 and end caps 7. For better understanding, the stator winding 13 is illustrated only on three of the stator teeth 3, which corresponds to a pole. The end caps 7 are bonded at the upper and lower front sides of the stator teeth 3.

In the stator teeth 3 and end caps 7 without any stator winding 13, the extent of the insulation film 45 which extends between the longitudinal sides 37 of two adjacent stator teeth 3 and which forms an insulating layer along the stator teeth 3 in an axial direction can be seen. Only in the gap between the end regions of the stator teeth 3 is there provided no insulation film 45 so that the needle can be guided during the needle winding between the stator teeth 3 in order to wind the winding wire 39 around the stator teeth 3 and the end caps 7.

The winding wires 39 of the stator winding 13 extend as coils around the stator teeth 3 and over the end caps 7. In this case, the winding wire 39 extends substantially transversely relative to the radial direction over the winding wire support 9 of the end cap 7. The winding wire 39 extends between the opposite projections 33 of the end caps 7 on the same stator tooth 3 along the base sides and the longitudinal sides 37 of the stator tooth 3, wherein the winding wire 39 is guided by the projections 33 of the winding wire support 9 over the front edges of the insulation film 45 without compressing the insulation film 45 in an axial direction. The insulation film 45 is thereby located on the base sides and the longitudinal side 37 of the stator tooth 3 in a planar and bubble-free manner.

he winding wire 39 which is wound around the stator tooth 3 is supported radially by the axially projecting winding space delimitations 11 and the tub-like longitudinal sides 37 of the stator tooth 3. The winding wire between adjacent stator teeth 3 is guided over the annular internal region 23 of the end disk 5. In this case, the winding wire 39 is guided inwardly between the support posts 19 of one end cap 7, then extends internally along the support posts 19 and then between the support posts 19 of the adjacent end cap 7 to the winding wire support 9 thereof.

Figure 6:
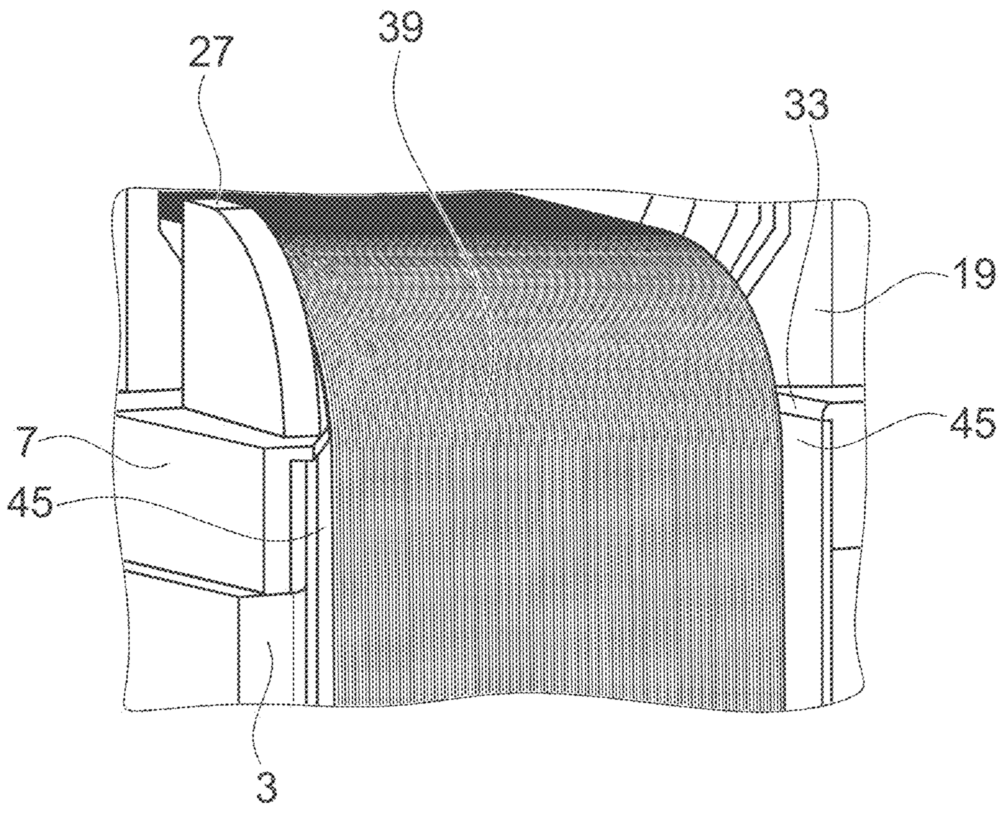
FIG. 6 shows as a three-dimensional view of a cutout from the stator winding the stator tooth and the end cap.

FIG. 6 shows as a three-dimensional view of a cutout from the stator winding 13 the stator tooth 3 and the end cap 7 in detail. The insulation film 45 extends between the winding wire 39 and the stator tooth 3 and the base 31.

As a result of the projection 33, no axial forces act on the insulation film 45 either through the winding wire 39 or through the application thereof during needle winding. This prevents the insulation film 45 from becoming bent in the direction of the gap between the adjacent stator teeth 3 and air, which possibly cannot escape during casting, being included. If the insulation film 45 were to be compressed by axial force action, during casting air bubbles could be produced between the insulation film 45 and the stator core 1, which would lead to a negative thermal behavior of the stator. Since the width of the edge 41 corresponds to the thickness of the insulation film 45, the winding wire 39 approaches the stator core 1 as close as possible, but with the insulation film 45 therebetween.

The base 31 of the end cap 7 and the insulation film 45 overlap. The axial length of the overlapping region corresponds to a predetermined leakage path with a safety buffer between the iron of the stator core 1 and the copper of the winding wire 39 so that discharges are avoided.

During the subsequent casting of the stator, the stator winding 13 is embedded in a casting material. The casting material can flow under the winding wires 39 on the winding wire support 9 through the flow channels 49 in the end caps 7 and the air escapes. The casting body which is formed by the hardened casting material has a substantially hollow-cylindrical shape, in which the stator winding 13 extends on the stator teeth 3. In order to avoid air inclusions, the insulation film 45 also extends in the cast state, as already mentioned above, in a planar and non-deformed manner between the stator winding 13 and the stator teeth 3 and the bases 31.

Figure 7:
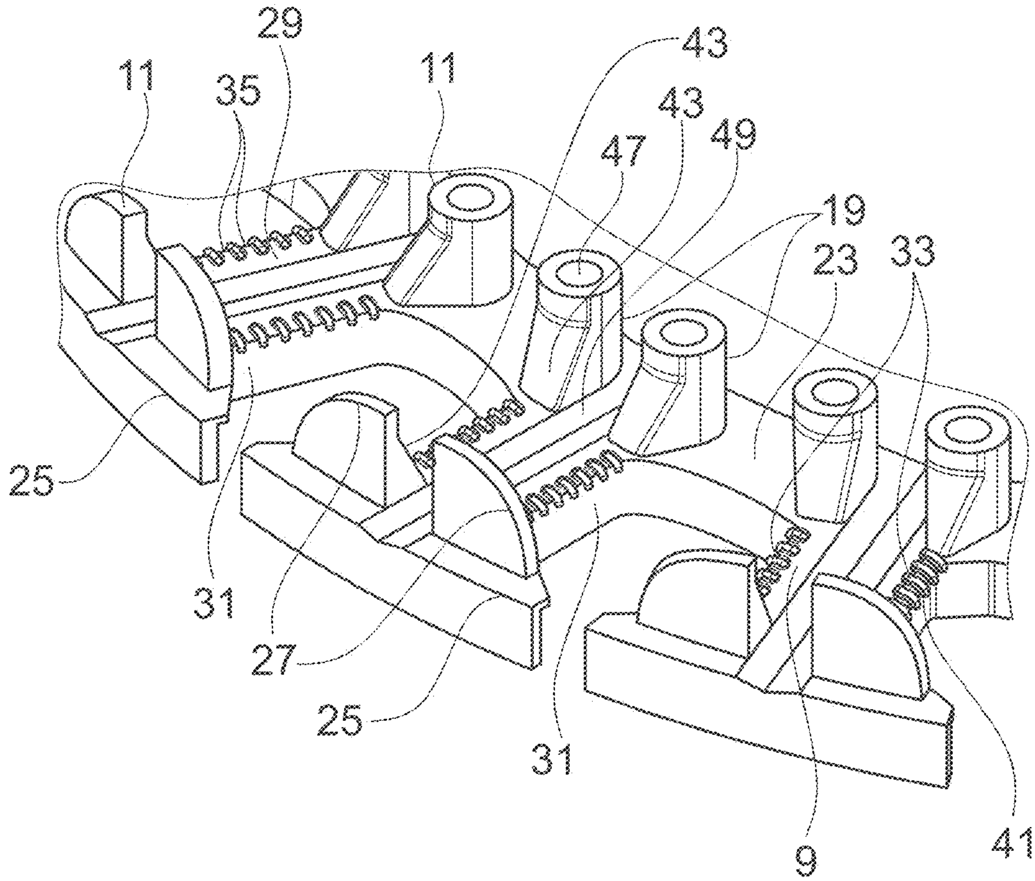
FIG. 7 shows a three-dimensional view of a cutout of the end disk.

FIG. 7 shows a detailed cutout from the end disk 5 with a plurality of end caps 7 as a three-dimensional illustration. The above-described features of the end caps 7 are readily evident in this illustration.

The base 31 brings about the axial spacing of the winding wire support 9 from the stator core 1. By combining the base length and in particular the insulation film 45 which overlaps the base 31 (not illustrated in FIG. 7), the desired leakage path is obtained.

The winding wire support 9 extends laterally over the base 31 and forms balcony-like projections 33 with edges 41 as stops for the insulation film 45.

The external winding space delimitation 11 comprises walls which project axially over the winding wire support 9 and between which there is a gap. The internal winding space delimitation 11 has two hollow support posts 19. The winding space delimitations 11 have mutually facing inclinations 43 of 60° in order both to radially support the coil and to allow an orthocyclic winding. The guiding grooves 35 in a radial and axial direction in the winding wire support 9 support the correct positioning of the first winding layer. The support posts 19 additionally act as a winding wire guide and ways of assembling and positioning a module which can be placed on the stator at the front.

The flow channel 49 extends in a radial direction over the entire upper side of the end cap 7. It extends between the winding space delimitations 11 and provides space under the coil so that the casting material can flow well and air bubbles are avoided. In this exemplary embodiment, the flow channel 49 has a triangular cross section.

Figure 8:
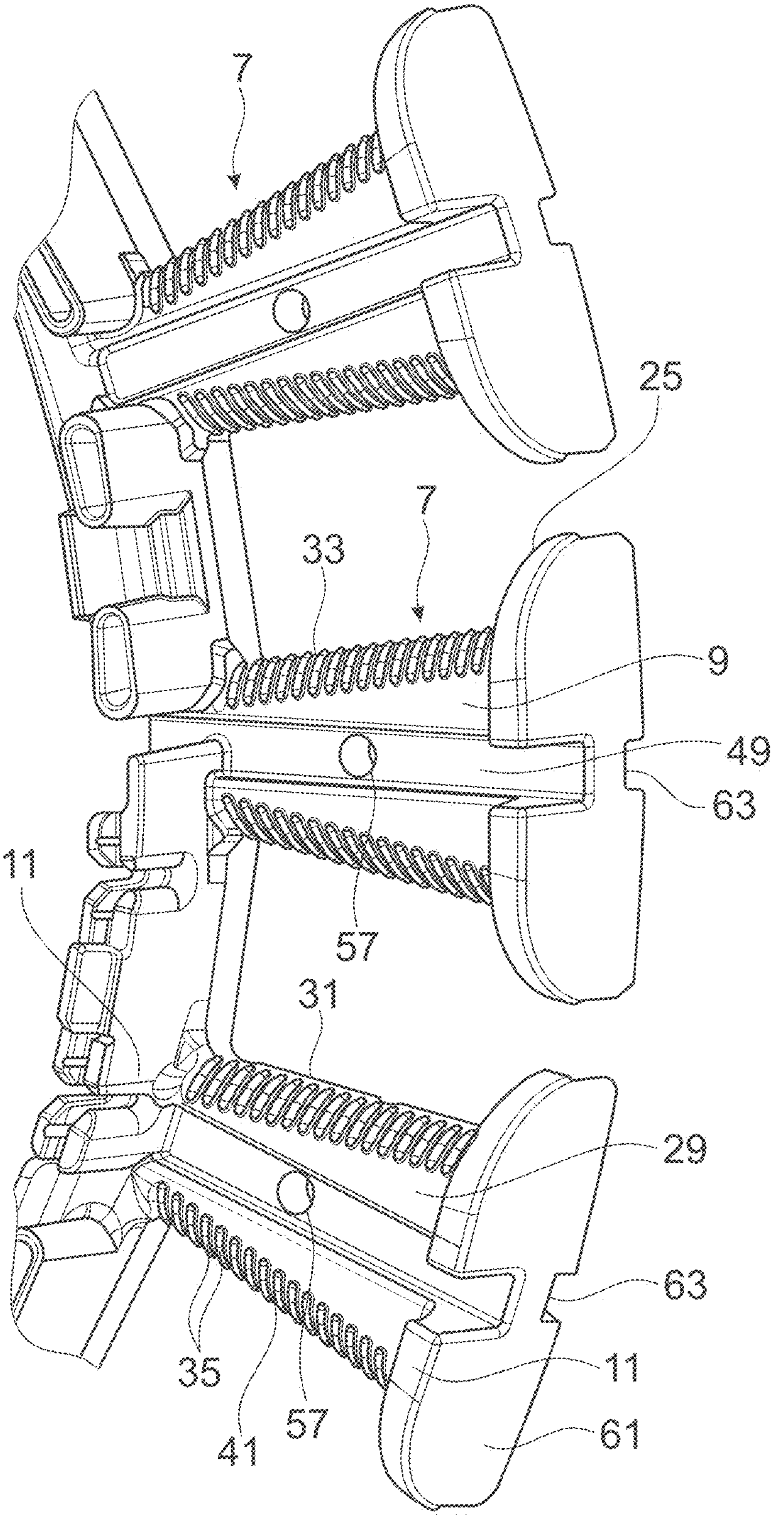
FIG. 8 shows a three-dimensional view of a cutout of a further exemplary embodiment of an end disk from above.

FIG. 8 shows a detailed cutout from a further exemplary embodiment of an end disk 5 with a plurality of end caps 7 in a three-dimensional plan view illustration. The following description focuses on differences compared to the previous exemplary embodiments.

The plan view contour of the winding wire support 9 widens as the radius increases, and therefore it has a trapezoidal basic shape. This facilitates the winding with needles. The winding wire support 9 extends laterally over the base 31 and forms balcony-like projections 33 with edges 41 as stops for the insulation film 45. Guiding grooves 35 are provided on the peripheral regions of the winding wire support 9.

A flow channel 49 extends in a radial direction over the entire upper side of the end cap 7. It extends between the winding space delimitations 11 and provides space under the coil so that the casting material can flow under the coil and air bubbles are avoided. In this exemplary embodiment, the flow channel 49 has a rectangular cross section.

On the front side of the end cap 7, below the flow channel 49, there is a cutout 63 through which casting material can flow under the end cap 7. A continuous, axially extending ventilation hole 57 is provided in the flow channel 49, the ventilation hole protruding into a hollow space 59 below the end cap 7 positioned thereon. Alternatively or in addition, one or more ventilation holes 57 can be arranged on the radially outwardly facing front side 61 of the end cap 7 such that they extend substantially radially. Positioning the ventilation hole 57 on the winding wire support 9 outside the flow channel 49 is also conceivable.

Figure 9:
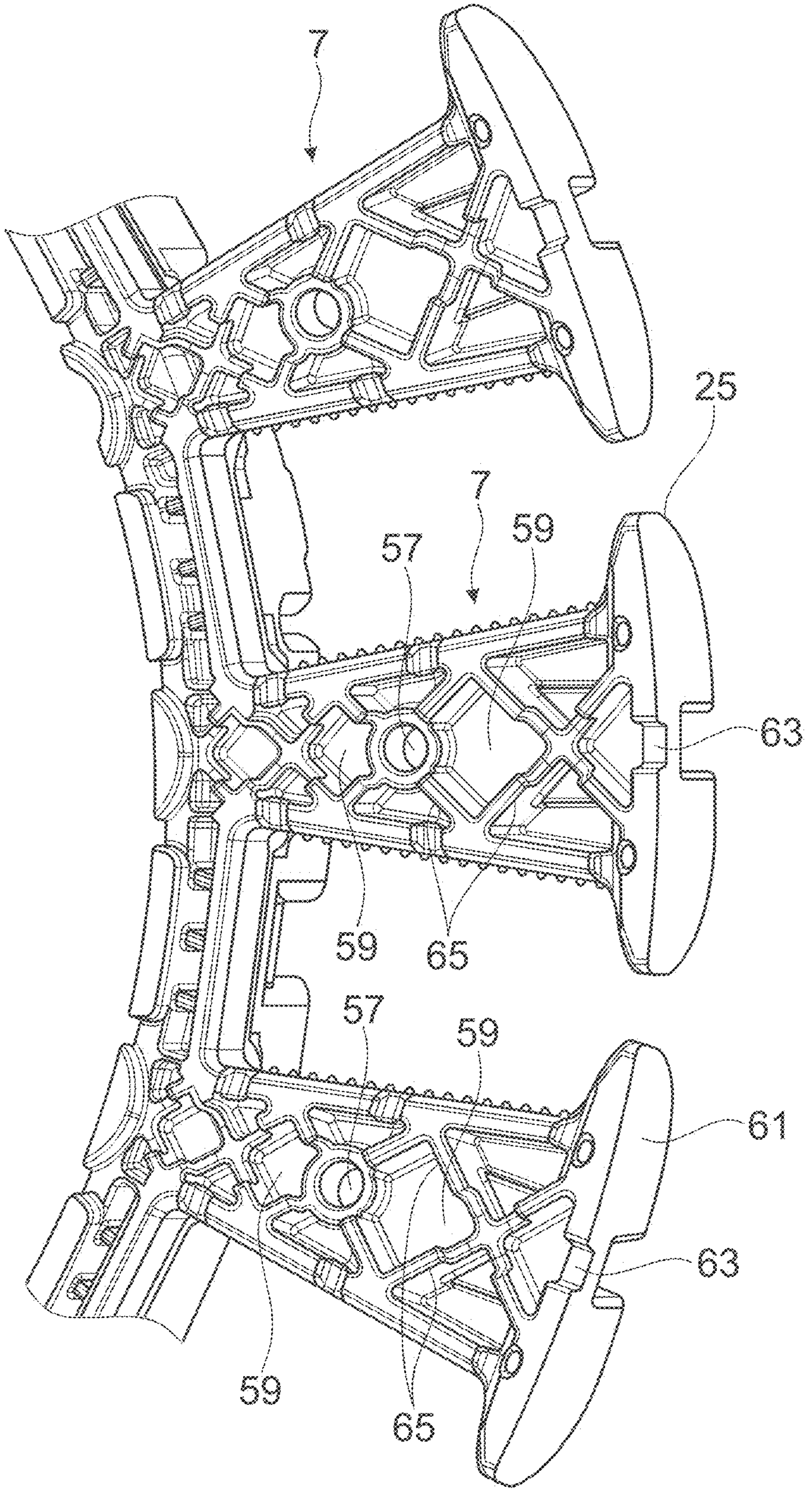
FIG. 9 shows a three-dimensional view of a cutout of the end disk from FIG. 8 from below.

FIG. 9 shows a detailed cutout of the end disk 5 from FIG. 8 in a three-dimensional illustration from below.

On the lower side of the end cap 7, below the winding wire support 9, there are cross struts 65 which are used for stability and facilitate the production of the end disk 5 with the end caps 7. Between the cross struts 65, the casting material can flow into the hollow space 59 below the end cap 7 positioned thereon. Not only can air escape through the ventilation hole 57 but, in particular in the event of casting in a vacuum, the ventilation hole 57 also facilitates the flow of the casting material, and therefore no hollow spaces form in the curing casting material.

The features set out above and in the claims and the features which can be taken from the illustrations can be achieved both individually and in different combinations. The invention is not limited to the described exemplary embodiments but instead can be modified in the context of professional craftsmanship in various manners.

REFERENCE NUMERALS

1 Stator core
3 Stator tooth
5 End disk
7 End cap
9 Winding wire support
11 Winding space delimitation
13 Stator winding
15 Wire guiding module
17 Channels
19 Support posts
21 Connection
23 Internal region
25 T-shaped region
27 Wall
29 Base
31 Base
33 Projection
35 Guiding groove
37 Longitudinal side
39 Winding wire
41 Edge
43 Inclination
45 Insulation film
47 Recess
49 Flow channel
53 Groove
55 Connection means
57 Ventilation hole
59 Empty space
61 Front side
63 Cutout
65 Cross strut

The invention claimed is:

1. A stator comprising;

a stator core which comprises a plurality of stator teeth each having a first and a second front side, at least a first end cap and at least a second end cap which each comprise a base and a winding wire support, wherein the first end cap is arranged on the first front side of one of the stator teeth and the second end cap is arranged on the second front side of the same stator tooth so that the base of the first end cap is directed toward the first front side and the base of the second end cap is directed toward the second front side, a stator winding having at least one winding wire which is wound over the first end cap and the second end cap around the stator tooth, wherein the winding wire support has two projections which project at opposite sides over the base, wherein the winding wire extends over the projections of the first and second end caps, and wherein there is provided an insulation film which comprises front edges and which extends between one of the projections of the first end cap and the opposite projection of the second end cap and which is arranged between the winding wire and the stator tooth, wherein the winding wire extends over the projections without applying any force action to the front edges of the insulation film, wherein a length of the insulation film is less than a spacing between the one of the projections of the first end cap and the opposite projection of the second end cap, wherein the first end cap has a lower side, and a hollow space is defined between the lower side and the first front side of the one of the stator teeth, wherein a flow channel is defined in the winding wire support of the first end cap, wherein a cutout is defined in the first end cap, the cutout being configured to allow casting material to flow under the first end cap, and wherein a ventilation hole is defined in the first end cap, the ventilation hole extending from the hollow space and being configured to allow air to escape from the hollow space when casting material flows into the hollow space under the first end cap.

2. The stator as claimed in claim 1, wherein the projection extends at least along a portion of the front edge of the insulation film, over which the winding wire extends.

3. The stator as claimed in claim 1, wherein the insulation film extends beyond the stator core so that the insulation film and the bases of the first and second end caps overlap.

4. The stator as claimed in claim 1, wherein the projections, between which the insulation film extends, each have a stop which is constructed to stop an axial movement of the insulation film and wherein a width of the stop corresponds to a thickness of the insulation film.

5. The stator as claimed in claim 4, wherein an overlap length of a portion of the insulation film which overlaps with the base corresponds to a predetermined leakage path between the winding wire and the stator core.

6. The stator as claimed in claim 1, wherein the insulation film is a first insulation film which extends along a first longitudinal side of the stator tooth, and wherein a second insulation film extends along a second longitudinal side, which is opposite the first longitudinal side, of the stator tooth and extends between the other projection of the first end cap and the opposite projection of the second end cap and is arranged between the winding wire and the stator tooth.

7. The stator as claimed in claim 1, wherein the winding wire supports of the first and/or second end cap have an external and an internal winding space delimitation which are radially spaced apart.

8. The stator as claimed in claim 1, wherein the projection has guiding grooves in which the winding wire extends.

9. The stator as claimed in claim 8, wherein the guiding grooves have rounded edges, the contour of which is in the form of a polynomial line.

10. The stator as claimed in claim 1, wherein the winding wire of the stator winding is wound with needles.

11. The stator as claimed in claim 7, wherein the external winding space delimitation is in the form of a wall or walls which project(s) axially over the winding wire support, and/or wherein the internal winding space delimitation comprises two hollow support posts as connection means.

12. The stator as claimed in claim 1, wherein the first and second end caps are included by a plurality of first end caps and a plurality of second end caps, respectively, and wherein the plurality of first end caps and the plurality of second end caps are arranged on the first or second front sides of the plurality of stator teeth.

13. The stator as claimed in claim 1, wherein the insulation film extends along mutually facing longitudinal sides of two adjacent stator teeth.

14. The stator as claimed in claim 12, wherein the plurality of first end caps are in the form of an integral end disk and/or the plurality of second end caps are in the form of integral end disks, and/or wherein several of the plurality of first end caps are in the form of an integral end disk segment and/or wherein several of the plurality of second end caps are in the form of an integral end disk segment.

15. The stator as claimed in claim 2, wherein the insulation film extends beyond the stator core so that the insulation film and the bases of the first and second end caps overlap.

16. The stator as claimed in claim 2, wherein the projections, between which the insulation film extends, each have a stop which is constructed to stop an axial movement of the insulation film and wherein a width of the stop corresponds to a thickness of the insulation film.

17. The stator as claimed in claim 1, wherein the flow channel extends radially in the winding wire support.

18. The stator as claimed in claim 1, wherein the first end cap further includes cross struts located on the lower side of the first end cap, with the cross struts being arranged such that casting material is able to flow into the hollow space between the cross struts.

* * * * *